United States Patent [19]

Legue

[11] 4,217,254

[45] Aug. 12, 1980

[54] HIGH GREEN STRENGTH CURABLE URETHANE ADHESIVE

[75] Inventor: Norris R. Legue, Scotch Plains, N.J.

[73] Assignee: Synthetic Surfaces, Inc., Scotch Plains, N.J.

[21] Appl. No.: 971,450

[22] Filed: Dec. 20, 1978

[51] Int. Cl.$^2$ .................. C08L 15/02; C08L 91/00
[52] U.S. Cl. .................. 260/3.3; 260/23.7 H; 260/29.2 TN
[58] Field of Search .................. 260/3.3, 23.7 H, 736, 260/859 R, 29.2 TN

[56] References Cited

U.S. PATENT DOCUMENTS 3,645,933  2/1972  Flint .................. 260/3.3

*Primary Examiner*—Theodore E. Pertilla
*Attorney, Agent, or Firm*—Carella, Bain, Gilfillan & Rhodes

[57] ABSTRACT

A curable urethane adhesive composition having an extra-ordinarily high green strength consisting essentially of a mixture of an isocyanate terminated ricinoleate prepolymer and chlorinated rubber curable by reaction with compounds having reactive hydrogens such as water, amines, polyols, urethanes, ureas and the like.

18 Claims, No Drawings

HIGH GREEN STRENGTH CURABLE URETHANE ADHESIVE

BACKGROUND OF THE INVENTION

Ricinoleate derived urethane adhesives that cure by reaction of the isocyanate groups with compositions having reactive hydrogens such as water, amines, urethanes, ureas, polyols and the like are well-known in the art. While these adhesives exhibit excellent adhesion, water resistance and flexibility after curing, they are deficient in green strength before curing for many applications. "Green strength" as used herein means the ability to hold two surfaces together when first contacted and before the adhesive develops its ultimate bonding properties when fully cured.

The degree of green strength exhibited by an adhesive is vital to many applications. High green strength tends to prevent wrinkling and slippage of films during laminations. In panel assembly and packaging it permits faster handling and wrapping. When adhesive is applied to a vertical surface, a sufficiently high green strength prevents a mechanically unsupported, bonded member from slipping under the influence of gravity. When employed for flocking, high green strength holds the fibers in place while the adhesive cures and in the laying of carpet or synthetic flooring, it resists curling due to the shape memory thereof acquired when stored in a roll.

Attempts to increase the green strength of isocyanate terminated ricinoleate prepolymers by adding other high polymers such as polyvinyl acetate, cellulose acetate butyrate, acrylics, polyketones, phenoxy and polyvinylchloride-vinyl acetate copolymers have proven unsuccessful.

Chlorinated rubber is known for its fast, tack-free dry and for that reason is often added to other products to quickly eliminate tack which is the antithesis of its use in adhesives as claimed in the present invention.

In accordance with the present invention, the use of chlorinated rubber with an isocyanate terminated ricinoleate prepolymer produces new and unexpected results including converting the prepolymer from one that has little tack to one that is tenacious. Since the tenacity occurs before the composition cures, it is referred to as green strength. Additionally, the aforesaid prepolymers with chlorinated rubber exhibit the quick grab properties of contact type adhesives when applied to only one substrate instead of both, improved adhesion to certain substrates, improved water resistance and hydrolytic stability and improved film forming properties.

The aforesaid advantages are achieved only with a ricinoleate derived prepolymer, the increase in green strength not being noted when using prepolymers not derived from ricinoleate polyols. Such non-ricinoleate derived prepolymers are either incompatible with chlorinated rubbers or, when compatible, exhibit quicker tack-free dry without improved green strength.

While high green strength makes the compositions of this invention particularly well suited for adhesives, the compositions also have utility as a coating. Isocyanate terminated urethanes that cure are often used interchangeably as both coatings and adhesives. A coating can be looked upon as a one substrate adhesive and an adhesive as a two-sided coating. The preferred type of urethane sealers, primers and topcoats for floors are those which develop sufficient hardness quickly so that they can accept traffic. This minimizes shutdown time whether it be a new construction site or an operating office, factory or other site. As used herein, the term "adhesive" is intended to include such coatings or other uses to which the claimed compositions may be put.

SUMMARY OF THE INVENTION

A curable adhesive composition consisting essentially of a solution in a suitable solvent of an isocyanate terminated ricinoleate prepolymer with an available isocyanate content, exclusive of solvent and expressed as 100% solids, at least as high as 2% by weight, and a chlorinated rubber having approximately 63% to 68% chlorine by weight, the chlorinated rubber appearing in quantities no more than approximately 70% by weight of the mixture of the chlorinated rubber and said prepolymer.

PREFERRED EMBODIMENT OF THE INVENTION

The aforesaid objects and advantages may be achieved from a mixture of chlorinated rubber and an isocyanate terminated ricinoleate prepolymer. The isocyanate groups are free to react with water, polyols, amines, urethanes, ureas and the like to form a cured adhesive.

The chlorinated rubber may be made by chlorinating the isoprene units of rubber so that the finished product has from 63%–68% chlorine having the empirical formula: $(C_{10}H_{11}Cl_7)_x$. Merely by way of example, the following chlorinated rubbers may be employed in this invention: PARLON S5, S10, S20, S40, S125, S300 manufactured by Hercules, Inc., Wilmington, Delaware and ALLOPRENE 5, 10, 20, 40, 125 manufactured by ICI United States, Inc., Wilmington, Delaware. The difference in these products lies in their molecular weight with the product numbers being the approximate centipoise viscosity at a 20% solids concentration in toluene.

The chlorinated rubber content by weight should be not more than approximately 70% of the chlorinated rubber and ricinoleate prepolymer combined. This percentage excludes changes which result from adding plasticizers, solvents, fillers, etc. The preferred types of chlorinated rubber for adhesives are the high molecular weight grades that give a viscosity above 100 centipoise at 20% concentration in toluene. The preferred type of chlorinated rubber for coatings are the lower molecular weight grades that give a viscosity below 100 centipoise at 20% concentration in toluene.

The isocyanate terminated ricinoleate prepolymer of this invention is made by reacting an isocyanate having an average functionality of 2 or greater with a ricinoleate polyol having an average hydroxyl functionality of 2 or greater. The polyol is reacted with an excess of isocyanate so that the available or residual isocyanate content of the finished prepolymer, excluding solvent and expressed as 100% solids, should be at least approximately 2% by weight.

Both aromatic and aliphatic polyisocyanates can be used to react with the ricinoleate polyol when making the isocyanate terminated ricinoleate prepolymer of this invention. The preferred polyisocyanates are toluene diisocyanate (TDI) and diphenylmethane diisocyanate (MDI). Illustrative of other suitable polyisocyanates are the following: isophorone diisocyanate (IPDI), 4,4,'4" triphenylmethane triisocyanate, polymethylene polyphenyl isocyanate, m-phenylene, 1-chlorophyenylene 2,4 diisocyanates, methylene-bis(4-cyclohexylisocyanate), or an equivalent. The methods of preparation of the above prepolymers are well known in the art and need no further explanation.

The ricinoleate polyols that can be used to react with the polyisocyanates to make the prepolymers of this invention are diol, triol, or higher polyhydric alcohol esters of ricinoleic acid. The preferred ricinoleate polyol is castor oil which is composed mostly of the triglyceride of ricinoleic acid. Illustrative of other ricinoleate (castor oil) derived polyols which may be used to obtain the ricinoleate urethane prepolymer are the following: glycerol monoricinoleate, glycerol diricinoleate, propylene glycol monoricinoleate, dipropylene glycol monricinoleate, ethyleneglycol monoricinoleate, polyethyleneglycol monoricinoleate, pentaerythritol monoricinoleate or an equivalent. The methods of preparation of the above polyols are well known in the art and need no further explanation.

The chlorinated rubber may be combined with the isocyanate terminated ricinoleate prepolymer by several methods. Merely by way of illustration and without limiting the scope of the claims hereof, some of the methods are: (a) The chlorinated rubber is dissolved in components used in the prepolymer manufacturing prior to or during the reaction process; (b) The chlorinated rubber is dissolved in the finished prepolymer; (c) The chlorinated rubber is added to the prepolymer as a solution of the chlorinated rubber dissolved in solvent, or dissolved in a non-reactive resin or in non-reactive plasticizer or combination of the same; (d) The chlorinated rubber could be added to the prepolymer dissolved in reactive materials such as polyols, amines or other solutions that react with isocyanate terminated ricinoleate prepolymers.

When combining by methods (a), (b) and (c) above, the composition of the isocyanate terminated ricinoleate prepolymer/chlorinated rubber mixture could be used as either a one package moisture cure urethane or as the isocyanate part of a two package urethane in which the other part is a reactive polyol, amine, or other material that reacts with isocyanate terminated ricinoleate prepolymers. In (d) the chlorinated rubber would be the part of a two package urethane that reacts with the other part which is the isocyanate terminated ricinoleate prepolymer.

The following examples are illustrative of the adhesives and coatings claimed herein.

EXAMPLE I

This example discloses the formulation, properties, performance, and testing of an adhesive in accordance with the invention claimed herein. The adhesive cures by the reaction of the isocyanate groups on the ricinoleate terminated prepolymer with water from the atmosphere. The mixture is stable for several months and is therefore considered to be a one-package, moisture cured, urethane adhesive.

| FORMULA | Wt. | Wt. | Wt. |
|---|---|---|---|
| Isocyanate terminated ricinoleate prepolymer* | 170.0 | 170.0 | 160.0 |
| Chlorinated rubber solution (20% solids)** | — | 14.8 | — |
| Chlorinated rubber solution (25% solids)** | — | — | 44.8 |
| Toluene | 28.2 | 18.5 | — |

*Castor oil/MDI prepolymer: having 4.4% by weight available isocyanate as a 70% solids solution in methyl ethyl ketone and toluene at 4:1 by weight.
**Hercules' PARLON S300 dissolved in toluene.

| Properties | | | |
|---|---|---|---|
| Viscosity (cps) | 200 | 300 | 1120 |
| Solution solids,(% by weight) | 60 | 60 | 60 |

The prepolymer and chlorinated rubber solution are mixed at the weight ratio shown. Viscosity was determined using a Brookfield Viscometer. The percent solids was determined by calculation.

Performance

The data in Table I illustrates the improvement in green strength between the control and the adhesive of this example.

Table I

| | | | |
|---|---|---|---|
| Parlon,(% by weight of total solids) | 0 | 2.4 | 9.1 |
| Finger tack | Oily | Tacky, Legs | Tacky, Legs |
| Green strength (finger) | 1 | 6 | 10 |
| Green strength*** | 0.1 | 1.3 | 1.5 |
| Bond strength (7 days)*** | 8.5 | 8.5 | 8.6 |
| Bond strength (14 days)*** | 8.5 | 9.0 | 10.0 |

***As determined by a Scott Pendulum Type Tensile Tester; the readings being employed for comparative purposes.

Test Procedure

The data set forth in Table I was determined in the following manner:

(A) Finger tack

An 8 mil. wet film was cast on glass using a draw down blade. The film was given approximately a five minute open-time to allow the solvent to evaporate. An index finger was pressed into the adhesive; withdrawn slowly; and based on its "feel" was rated as oily or tacky. In the latter case, a material rated as tacky not only had tack but also had a high green strength, legs and grab.

(B) Green strength (finger test)

An 8 mil. wet film was cast on glass using a draw down blade. The film was given approximately five minutes open time in order to allow the solvent to evaporate. The relative green strength was determined subjectively by pressing an index finger into the adhesive and removing it slowly. A green strength rating of 1 or "poor" indicates that little force was necessary to remove one's finger and a rating of 10 or "excellent" means that a very high force was required to pull away from the glass.

(C) Green strength (Scott Pendulum Type Tensile Tester)

A 5 mil. wet film, 1" wide and 3" long, was cast on an aluminum panel using a draw down blade. After five minutes open time to allow the solvent to evaporate, a piece of natural cotton fabric was pressed into the adhesive and rolled using a 2 lb. weight. The relative green strength of this lamination was determined by immediately placing it in the Scott Pendulum Type Tensile Tester and pulling the aluminum and fabric in opposite directions at the rate of two inches per minute (shear adhesion). The numbers recorded were direct readings from the tester with the lowest numbers being the poorest green strength and the highest numbers being the strongest.

(D) Bond strength

The solution was applied to two pieces of 1" wide natural cotton fabric using a paint brush. After a five minute open-time to allow the solvent to evaporate, the two coated pieces of fabric were then pressed together like contact cement. After curing, the samples were subjected to a 90° Peel Strength Test using the Scott Pendulum Type Tensile Tester by pulling apart at a rate of about 2 inches/minute. The numbers shown are the direct readings from the tester with the lowest number being the weakest bond and the highest number being the strongest peel strength.

EXAMPLE II

The principal difference between the adhesive formulation of this example and that of Example I is that the isocyanate terminated ricinoleate prepolymer in this example is made by reacting castor oil and toluene diisocyanate whereas the ricinoleate prepolymer in Example I was made from reacting castor oil and diphenylmethane diisocyanate. The test procedures were the same as employed in Example I.

| FORMULA | Wt. | Wt. | Wt. |
|---|---|---|---|
| Isocyanate terminated ricinoleate prepolymer* | 160.0 | 160.0 | 150.0 |
| Chlorinated rubber (20% by weight solids)** | — | 15.2 | 56.3 |
| Toluene | 40.0 | 30.0 | — |

*Castor oil/TDI prepolymer: having 3.5% by weight available isocyanate as a 75% by weight solids solution in methyl ethyl ketone.
**Hercules' PARLON S-300 dissolved in toluene.

| Properties | | | |
|---|---|---|---|
| Viscosity (cps) | 150 | 270 | 880 |
| Solution solids,(% by weight) | 60 | 60 | 60 |

Performance

The data in TABLE II shows the improvement in green strength between the control and the adhesive of this example.

Table II

| PARLON,(% by weight of solids) | 0 | 2.5 | 9.1 |
|---|---|---|---|
| Finger tack | Oily | Tacky, Legs | Tacky, Legs |
| Green strength (finger) | 1 | 6 | 10 |
| Green strength*** | 0.1 | 0.8 | 1.3 |
| Bond strength (7 days)*** | 6.0 | 6.0 | 7.5 |
| Bond strength (14 days)*** | 6.5 | 8.0 | 9.5 |

***Scott Pendulum Type Tensile Tester; the readings being employed for comparative purposes.

EXAMPLE III

The principal difference between the adhesive formulation of this example and that of Example II is that a lower molecular weight chlorinated rubber was employed. The chlorinated rubber in this example has a viscosity of approximately 125 cps at a 20% solids by weight concentration in toluene whereas in Example II it had a viscosity of approximately 300 cps at the same concentration. The test procedures were the same as employed in Example I.

| FORMULA | Wt. | Wt. |
|---|---|---|
| Isocyanate terminated ricinoleate prepolymer* | 160.0 | 150.0 |
| Chlorinated rubber solution (20% by weight solids)** | — | 28.1 |
| Toluene | 40 | 18.7 |

*Castor oil/TDI prepolymer: having 3.5% by weight available isocyanate as a 75% by weight solids solution in methyl ethyl ketone.
**Hercules' PARLON S-125 dissolved in toluene.

| Properties | | |
|---|---|---|
| Viscosity (cps) | 150 | 340 |
| Solution solids,(% by weight) | 60 | 60 |

Performance

The data in Table III shows the improvement in green strength between the control and the adhesive of this example.

Table III

| PARLON,(% by weight of solids) | 0 | 4.8 |
|---|---|---|
| Finger tack | Oily | Tacky, Legs |
| Green strength (finger) | 1 | 8 |
| Green strength*** | 0.1 | 1.0 |
| Bond strength (7 days)*** | 6.0 | 6.0 |
| Bond strength (14 days)*** | 6.5 | 8.5 |

***Scott Pendulum Type Tensile Tester; the readings being employed for comparative purposes.

EXAMPLE IV

The principal difference between the adhesive formulation of this example and those of Examples I, II and III is that the isocyanate terminated ricinoleate prepolymer is made from an aliphatic isocyanate whereas in the first three examples an aromatic isocyanate was employed.

| FORMULA | Wt. | Wt. |
|---|---|---|
| Isocyanate terminated ricinoleate prepolymer* | 100.0 | 100.0 |
| Chlorinated rubber solution (20% by weight solids)** | — | 18.4 |
| Dibutyltin dilaurate (catalyst) | 0.1 | 0.1 |

*Castor oil/IPDI prepolymer: having 5.2% by weight available isocyanate as a 70% by weight solids solution in methyl ethyl ketone and toluene at 1:1 by weight.
**Hercules' PARLON S-300 dissolved in toluene.

Performance

The data in Table IV illustrates the improvement in green strength between the control and the adhesive of this example.

Table IV

| PARLON,(% by weight of solids) | 0 | 5 |
|---|---|---|
| Finger tack | Oily | Tacky, Legs |
| Green strength (finger) | Poor | Excellent |
| Green strength*** | 0.1 | 0.8 |

***Scott Pendulum Type Tensile Tester, the readings being employed for comparative purposes.

EXAMPLE V

The principal difference between the adhesive formulation of this example and those of Examples I, II, III and IV is that this example illustrates a two package adhesive in which the isocyanate groups on the isocyanate terminated ricinoleate prepolymer react with active hydrogens of hydroxyl groups on a polyol rather than with active hydrogens from atmospheric moisture as was the case in the said previous examples. The chlorinated rubber of this example is included as part of the polyol solution whereas in the first four examples as well as Example IX hereafter, the chlorinated rubber is added as part of the prepolymer.

| FORMULA | Wt. | Wt. |
|---|---|---|
| Part A | | |
| Polyol* | 35 | 35 |
| Chlorinated rubber solution (20% by weight solids)** | — | 325 |
| Toluene | 35 | — |

*Castor oil/TDI adduct having 2.1% by weight available hydroxyl as a 100% by weight solids, with a viscosity of 90,000 cps.
**Hercules' PARLON S-125 dissolved in toluene.

| Part B | | |
|---|---|---|
| Isocyanate terminated ricinoleate prepolymer*** | 45.3 | 45.3 |

***Castor oil/MDI prepolymer having 4.4% by weight available isocyanates as a 70% by weight solids solution in methyl ethyl ketone and toluene at 4:1 by weight.

Performance

The data in Table V illustrates the improvement in green strength between the control and the adhesive of this example.

Table V

| | | |
|---|---|---|
| PARLON,(% by weight of polyol) | 0 | 65 |
| PARLON,(% by weight of prepolymer) | 0 | 67 |
| PARLON,(% by weight of total solids) | 0 | 49 |
| Finger tack | Oily | Tacky, Legs |
| Green strength (finger) | Poor | Excellent |
| Green strength**** | 0.3 | 5.0 |

****Scott Pendulum Type Tensile Tester, the readings being employed for comparative purposes.

EXAMPLE VI

The principal difference between the formulation of this example and that of Example V is that this example illustrates a two package urethane coating prepared with a low molecular weight chlorinated rubber whereas EXAMPLE V illustrates an adhesive prepared with a high molecular weight chlorinated rubber.

| FORMULA | Wt. | Wt. |
|---|---|---|
| Part A | | |
| Polyol* | 50 | 50 |
| Chlorinated rubber solution (25% by weight solids)** | — | 200 |
| Toluene | 50 | — |

*Castor oil
**Hercules'PARLON S-10 dissolved in toluene

| Part B | | |
|---|---|---|
| Isocyanate terminated ricinoleate prepolymer*** | 135 | 135 |

***Castor oil/MDI prepolymer having 4.4% by weight available isocyanate as a 70% by weight solids solution in methyl ethyl ketone and toluene at 4:1 by weight.

Performance

The data in Table VI illustrates the rapid development of hardness and toughness between the control and the coating of this example.

Table VI

| | | |
|---|---|---|
| PARLON,(% by weight of prepolymer) | 0 | 35 |
| PARLON,(% by weight of total solids) | 0 | 26 |
| Hardness (Sward Rocker) 4 hours dry | 0 | 4 |
| Hardness (Sward Rocker) 24 hours dry | 2 | 22 |
| Fingernail scratch of film 4 hours dry | Cheesy | Tough |

EXAMPLE VII

The principal difference between the coating of this example and that of Example VI is that this illustrates a one package, moisture-cure, urethane whereas Example VI illustrates a two package urethane which cures by the reaction of hydroxyl groups on the polyol with isocyanate groups on the ricinoleate prepolymer.

| FORMULA | Wt. | Wt. |
|---|---|---|
| Isocyanate terminated ricinoleate prepolymer* | 100 | 100 |
| Chlorinated rubber solution (25% solids)** | — | 300 |
| Toluene | 25 | — |

*Castor oil/TDI prepolymer having 3.5% by weight available isocyanate as a 75% by weight solids solution in methyl ethyl ketone.
**Hercules' PARLON S10 dissolved in toluene.

Performance

The data in Table VII shows the rapid development of hardness for the coating of this invention as compared to the control.

Table VII

| | | |
|---|---|---|
| PARLON,(% by weight of solids) | 0 | 50 |
| Hardness, (Sward Rocker), 4 hours | 0 | 10 |
| Hardness, (Sward Rocker), 24 hours | 2 | 28 |
| Hardness, (Sward Rocker), 36 hours | 4 | 28 |

EXAMPLE VIII

The principal difference between the coating of this example and that of Example VII is the isocyanate terminated ricinoleate prepolymer which is aliphatic and prepared from glycerol monoricinoleate whereas in Example VII the prepolymer is aromatic and prepared from castor oil.

| FORMULA | Wt. | Wt. |
|---|---|---|
| Isocyanate terminated ricinoleate prepolymer* | 81.3 | 81.3 |
| Chlorinated rubber solution (25% by weight solids)** | — | 140.0 |
| Toluene | 20.0 | 20.0 |
| Dibutylin dilaurate catalyst | 0.1 | 0.1 |

*Glycerol monoricinoleate/IPDI prepolymer having 9% by weight available isocyanate as a 80% by weight solids solution in xylene with a viscosity of 2500 cps.
**Hercules' PARLON S10 dissolved in toluene.

Performance

The data in Table VIII illustrates the difference in hardness and toughness between the coating of the control and that of this example.

Table VIII

| | | |
|---|---|---|
| PARLON,(% by weight of solids) | 0 | 37 |
| Hardness (Sward Rocker), 4 hours dry | 0 | 14 |
| Hardness (Sward Rocker), 24 hours dry | 23 | 36 |
| Hardness (Sward Rocker), 48 hours dry | 34 | 36 |
| Fingernail scratch of film, 4 hours | Cheesy | Tough |

EXAMPLE IX

The principal difference between the two package adhesive of this example and that of Example V is that the chlorinated rubber in this example is included with the prepolymer whereas in Example V it is mixed with the polyol.

| FORMULA | Wt. | Wt. |
|---|---|---|
| Part A | | |
| Diol* | 210 | 210 |
| *Upjohn's N, N-bis (2 hydroxypropyl) aniline (Isonol 100) as a 50% by weight solids in methyl ethyl ketone. | | |
| Part B | | |
| Isocyanate terminated ricinoleate prepolymer** | 1050 | 1050 |
| Chlorinated rubber solution (20% by weight solids)*** | — | 207 |
| **Castor oil/MDI prepolymer having 4.4% by weight available isocyanate as a 70% by weight solids solution in methyl ethyl ketone and toluene at 4:1 by weight. | | |
| ***Hercules' PARLON S300 dissolved in toluene. | | |

Performance

The data in Table IX illustrates the improvement in green strength between the control and the adhesive of this example.

Table IX

| PARLON, (% by weight of prepolymer) | 0 | 5.3 |
|---|---|---|
| PARLON, (% by weight of total solids) | 0 | 4.7 |
| Finger Tack | Oily | Tacky, Legs |
| Green strength (finger) | Poor | Good |

It will be understood by those skilled in the art that many modifications and variations of the present invention may be made without departing from the spirit and the scope thereof.

What is claimed is:

1. A curable adhesive composition consisting essentially of a solution in a suitable solvent of
   (a) an isocyanate terminated ricinoleate prepolymer having an available isocyanate content exclusive of solvent and expressed as 100% solids at least as high as 2% by weight, and
   (b) a chlorinated rubber having approximately 63% to 68% by weight chlorine, the chlorinated rubber appearing in quantities no more than approximately 70% by weight of the mixture of chlorinated rubber and the said prepolymer.

2. A curable adhesive composition in accordance with claim 1 in which
   (a) the said prepolymer is prepared from reacting an isocyanate having an average functionality of at least 2 with a ricinoleate polyol having an average hydroxyl functionality of at least 2.

3. A curable adhesive composition in accordance with claim 1 in which
   (a) the said chlorinated rubber is prepared by chlorinating the isoprene units of rubber.

4. A curable adhesive composition in accordance with any one of claims 1, 2 or 3 in which
   (a) the prepolymer is prepared by reacting toluene diisocyanate with a ricinoleate polyol.

5. A curable adhesive composition in accordance with any one of claims 1, 2 or 3 in which
   (a) the prepolymer is prepared by reacting diphenylmethane diisocyanate with a ricinoleate polyol.

6. A curable adhesive composition in accordance with any one of claims 1, 2 or 3 in which
   (a) the prepolymer is prepared by reacting isophorone diisocyanate with a ricinoleate polyol.

7. A curable adhesive composition in accordance with any one of claims 1, 2, 3, 4, 5 or 6 in which
   (a) the prepolymer is prepared by reacting an isocyanate having a functionality of at least 2 with a ricinoleate polyol composed mostly of the triglyceride of ricinoleic acid (castor oil).

8. A curable adhesive composition comprising at least two separate, mixable parts respectively consisting essentially of a solution in a suitable solvent of
   (a) an isocyanate terminated ricinoleate prepolymer having an available isocyanate content exclusive of solvent and expressed as 100% solids at least as high as 2% by weight as one part, and
   (b) a chlorinated rubber having approximately 63% to 68% by weight chlorine, and an agent having an active hydrogen capable of reacting with the isocyanate terminated ricinoleate prepolymer to produce a curable adhesive as the other part.

9. A curable adhesive composition in accordance with claim 8 in which
   (b) the said agent is a polyol.

10. A curable adhesive composition in accordance with claim 8 in which
    (b) the said agent is an adduct of castor oil and an isocyanate having available hydroxyls as a source of said reactive hydrogens.

11. A curable adhesive composition in accordance with claim 8 in which
    (b) the said agent is an amine.

12. A curable adhesive composition in accordance with claim 8 in which
    (b) the said agent is a urethane.

13. A curable adhesive composition in accordance with claim 8 in which
    (b) the said agent is a urea.

14. A curable adhesive composition comprising at least two separate, mixable parts respectively consisting essentially of a solution in a suitable solvent of
    (a) an isocyanate terminated ricinoleate prepolymer having an available isocyanate content exclusive of solvent and expressed as 100% solids at least as high as 2% by weight and a chlorinated rubber having approximately 63% to 68% by weight chlorine as one part, and
    (b) an agent having an active hydrogen capable of reacting with the isocyanate terminated ricinoleate prepolymer to produce a curable adhesive.

15. A curable adhesive composition in accordance with claim 14 in which
    (b) the said agent is a polyol.

16. A curable adhesive composition in accordance with claim 14 in which
    (b) the said agent is an amine.

17. A curable composition in accordance with claim 14 in which
    (b) the said agent is a urethane.

18. A curable composition in accordance with claim 14 in which
    (b) the said agent is a urea.

* * * * *